United States Patent

[11] 3,617,550

[72] Inventors Chaim Elata
Savion;
Jonatan Ben-Dror, Rehovot, both of Israel
[21] Appl. No. 864,309
[22] Filed Oct. 7, 1969
[45] Patented Nov. 2, 1971
[73] Assignee Hydronautics-Israel Ltd.
Rehovot, Israel
[32] Priority Apr. 4, 1969
[33] Israel
[31] 31963

[54] METHOD AND APPARATUS FOR THE CONCENTRATION OF SOLUTIONS
7 Claims, 1 Drawing Fig.
[52] U.S. Cl. .................................................. 210/23,
210/321
[51] Int. Cl. ...................................................... B01d 13/00
[50] Field of Search .......................................... 210/22, 23,
321, 500, 252, 259

[56] References Cited
UNITED STATES PATENTS
2,540,152  2/1951  Weller .......................... 210/500 X OTHER REFERENCES
Michaels, "Ultrafiltration," a Publication of the Amicon Corporation, March, 1968, 27 pages, pp. 13–25 relied on.

Primary Examiner—Frank A. Spear, Jr.
Attorney—Finnegan, Henderson & Farabow

ABSTRACT: A feed solution containing a solute and a solvent is concentrated by reverse osmosis. The feed solution is subjected to a given working pressure and is first forced through a series of high rejection membranes. The diluted solution which permeates the high rejection membranes is discarded and the product solution leaving the high rejection membranes is then passed as a feed solution through a series of low rejection membranes. The dilute solution which permeates through the low rejection membranes is preferably recycled to the starting feed solution, but can be discarded, if desired. The product comprises the concentrated solution which does not permeate the low rejection membranes. The working pressure of the solution fed to both the high rejection membrane and the low rejection membranes should exceed $R^2\pi'$ where: R is the rejection ratio of the membrane and $\pi'$ is the osmotic pressure of the solution being fed to the membrane.

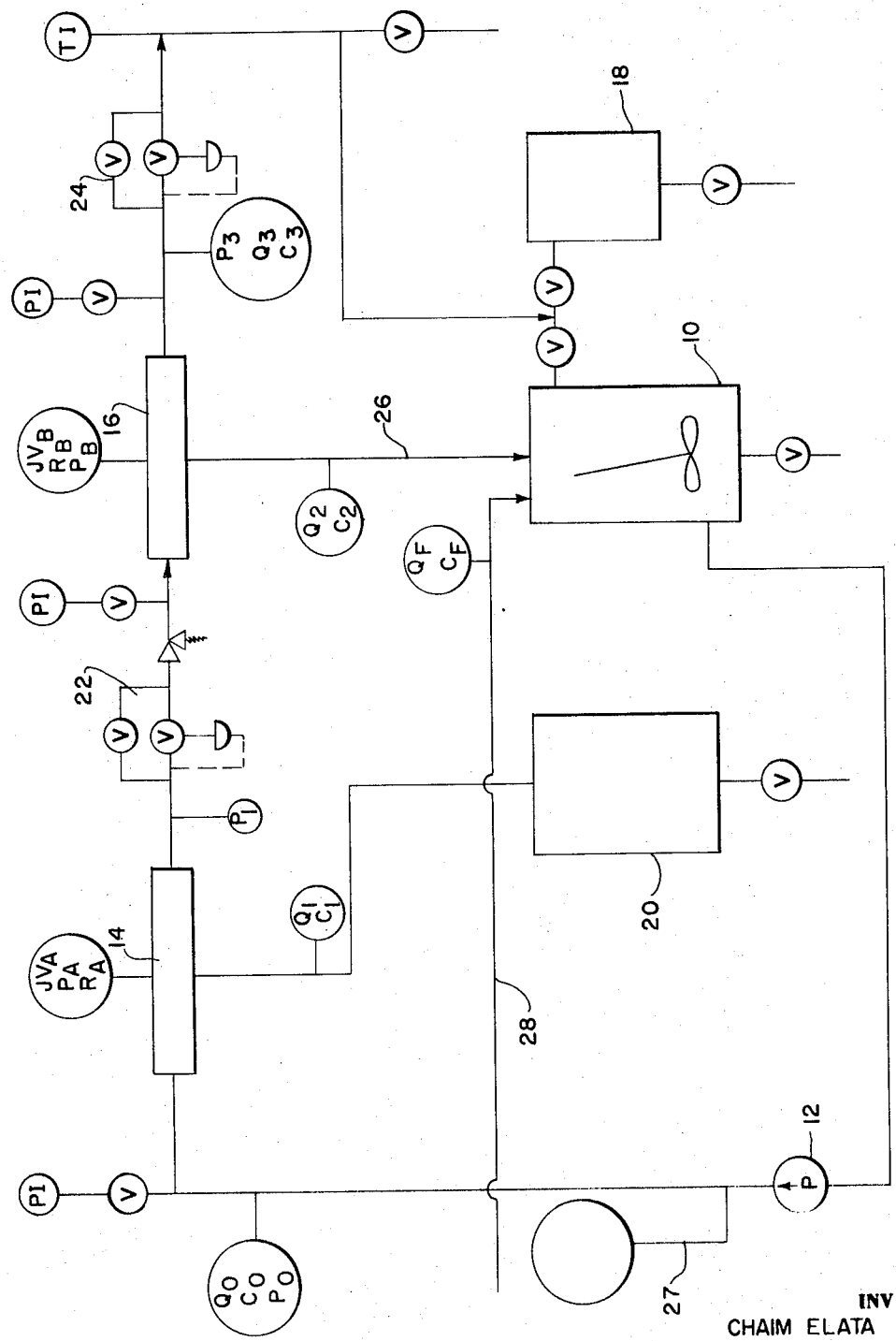

METHOD AND APPARATUS FOR THE CONCENTRATION OF SOLUTIONS

The present invention relates to a new and improved system for the concentration of solutions, and more particularly, to a new and improved method and apparatus for concentrating solutions by reverse osmosis.

Various techniques for concentrating solutions by removal of the solvent are well known and include such methods as evaporating the solvent by heating or in a vacuum or freezing the solvent and then removing it in crystallized form.

Such methods however have not been entirely satisfactory in the past because they are based on a change of phase to effect solvent removal and are oftentimes complicated and expensive to carry out. Further, some of the dissolved solids which should be retained in the concentrated solutions are lost and/or decomposed by these methods.

More recently, reverse osmosis techniques have been tired in an attempt to overcome many of the problems of conventional liquid concentration procedures.

Briefly, the principles of reverse osmosis can be summarized as follows: When a solution and pure water are separated by a barrier (membrane) which is permeable to water, an energy gradient is generated which causes the water to pass through the membrane from the pure water side to the solution.

The hydraulic flow rate of the water can be related to an effective pressure head which is proportional to the concentration of the solution and is called the osmotic pressure of the solution. Hence, hydraulic flow can be slowed down by increasing the hydrostatic head on the solution side. When the hydrostatic head becomes equal to the osmotic pressure, no flow occurs, and when the hydrostatic head exceeds the osmotic pressure, the flow is reversed and the water now passes from the solution to the fresh water side of the separating membrane.

In the specification and claims of this patent application, the solution to be concentrated containing a solvent and a solute will be called a "feed solution" and the concentrated solution obtained during the concentration process will be called "product solution."

Hence, in concentrating solutions by reverse osmosis, the feed solution is placed in contact with a semipermeable membrane, i.e., a membrane through which water may flow but which is s substantially impervious to any solutes such as sugars, organic esters and electrolytes, and a pressure is applied to the feed solution, which is larger than its osmotic pressure, Thus, relatively pure water flows through the membrane and a solution enriched in solute remains on the feed solution side of the membrane.

The above explanation has been made with reference to water, however, a variety of solvents can be removed using reverse osmosis concentration techniques.

While such reverse osmosis techniques have been used experimentally for concentrating solutions, serious difficulties have been encountered in attempting to commercially concentrate solutions by reverse osmosis.

A concentrated product solution usually has a high osmotic pressure. Thus, very high hydrostatic pressures that exceed the osmotic pressure of the product solution must be applied in order to obtain concentrated products. Presently available membranes, however, undergo rapid compaction when subjected to such high pressures and suffer a simultaneous loss in flux (permeability rate). This compaction reduces the useful life of the membrane and can significantly affect the cost of concentrating solutions if frequent replacement of membranes is made necessary. A related problem is the capital expense required to construct an entire system capable of withstanding the high pressures.

Thus, there has been a continuing search to find a method based on the principles of reverse osmosis, which can economically produce concentrated solutions at reduced hydrostatic pressures and thereby permit the successful use of commercially available membranes and the use of relatively inexpensive apparatus.

The present invention is based on a method for the concentration of a feed solution by way of reverse osmosis in which the product solution produced by the method is characterized by an osmotic pressure that is higher than the sum of the highest hydrostatic working pressure applied to the feed solution and the osmotic pressure of the solution that permeates through the reverse osmosis membranes and is discarded.

The invention also provides a method in which the volumetric flows are minimized so that only a relatively small area of membrane is needed to produce a desired volume of product per day.

In accordance with the present invention, a feed solution to be concentrated is passed in succession through two series of membranes; the first series of membranes being composed of high rejection membranes and the second series of membranes being composed of high rejection membranes.

The present invention also comprises an apparatus including a high rejection membrane or preferably a plurality of high rejection membranes in series which first received the feed solution and separate the feed solution into a concentrated feed solution which does not pass through the membranes and a solvent solution which permeates through the membranes; means for passing the concentrated feed solution to a plurality of low rejection membranes which separate the concentrated feed solution into a product solution which does not pass through the second stage of low rejection membranes and a dilute solution which permeates through the low rejection membranes.

The apparatus also includes means for applying and adjusting the working pressure within the membranes; supply means for feeding the feed solution to the high rejection membranes; removal means for disposing of the solvent solution that permeates through the high rejection membranes; and means for collecting and withdrawing the concentrated product solution that has not passed through the low rejection membranes.

Means are also provided for either removing and disposing of the dilute solution that permeates through the low rejection membranes or for recycling it to the feed solution.

It is to be understood that both the foregoing general description and the following detailed description are exemplary and explanatory, but are not restrictive of the invention.

The accompanying drawing, which is incorporated in the constitutes a part of this specification, illustrates an embodiment of the invention and together with the description serves to explain the principles of the invention.

The drawing is a schematic flow sheet of an apparatus for carrying out the method of the invention.

The performance of the method according to the present invention may be best explained by reference to the following equations:

The salt rejection $R$ in reverse osmosis is given by the formula $$R = C' - C''/C' = 1 - C''/C' \quad (1)$$

wherein $C'$ and $C''$ refer to the solid concentrations on the high-pressure and low-pressure side of the membrane, respectively. Hence the difference $\Delta C$ between the concentrations can be expressed by the formula:

$$\Delta C = C' - C'' = -RC' \quad (2)$$

The osmotic pressure $\pi$ of a solution is nearly directly proportional to its concentration and thus the osmotic pressure difference $\Delta \pi$ can be expressed by the formula: $\Delta \pi = -R\pi'$.

Furthermore: $Jv = -Lp(\Delta P - \theta \Delta \pi)$ (3) wherein:

$Jv$ = water flux, i.e., the number of gallons of solvent, for example, water that pass through 1 square foot of the membrane per day;

$\Delta p$ = hydrostatic pressure difference between the low-pressure and the high-pressure sides of the membrane;

$Lp$ = volume permeability coefficient, i.e., number of gallons of solution permeating through 1 square foot per day under a pressure of 1 p.s.i.;

$\Delta \pi$ = osmotic pressure difference between the solutions at the low-pressure and the high-pressure sides of the membrane; and $\theta$ = salt rejection at infinite applied pressure difference;

When $Jv$ is large, $\theta \cong = R$ and thus equation (3) is converted to $Jv = -Lp(\Delta P + R^2\pi')$  (4)

For reverse osmosis to occur, therefor, the hydrostatic pressure applied to a given membrane must always be larger than $R^2\pi'$.

The present invention thus comprises a method for concentrating a feed solution wherein the feed solution while being subjected to a certain working pressure is first passed through a series of high rejection membranes. The diluted solution permeating through the membranes is discarded and the product solution leaving the high rejection membrane is, while still being subjected to a working pressure, passed as feed solution through a series of low rejection membranes.

The product solution is collected and the diluted solution permeating through the low rejection membranes can be discarded, or preferably, recycled to the starting feed solution. The working pressure of the solution fed to the high rejection membranes should be larger than the value of $R^2\pi'$ (as hereinbefore defined) for the high rejection membrane, and the working pressure of the solution fed to the low rejection membranes should be larger than the valve of $R^2\pi'$ for the low rejection membrane.

The rejectivity of the high rejection membranes must be higher than that of the following series of membranes. High rejection membranes are those membranes in which a maximum amount of dissolved solids, i.e., nearly 100 percent are rejected. Desirably, only almost pure solvent permeates the high rejection membranes. In this case $\theta \cong R \cong 1$ and thus the feed solution can be concentrated therein until the osmotic pressure of the resulting product solution nearly equals the working pressure applied.

Low rejection membranes allow some dissolved solids to permeate through the membrane with the solvent. In this case $R<1$ and the feed solution, which has been already concentrated to a certain extent in the first stage, i.e., within the high rejection membranes, can be concentrated until the new $R^2\pi'$ of the low rejection membranes again nearly equals the working pressure.

The solids permeability rate the low rejection membrane can vary depending on the working conditions and concentration of solution desired. The lower the solids concentration requirement for the product solution, for example, the higher can be the rejection rate of the membranes because the product solution will have a low osmotic pressure and reasonable hydrostatic pressure in the second stage will still produce acceptable flux rates.

On the other hand, the higher the required concentration of the final product solution (and thus its osmotic pressure), the more permeable the low rejection membranes should be. Preferably, the amount of dissolved solids retained should at least equal the amount of solids permeating through the second stage membrane with the solvent.

The type of membrane to be utilized is not a critical feature of the present invention, as long as the membrane fulfills the requirements of the specific concentration process to be performed, i.e., has the desired volume permeability coefficient ($Lp$) and withstands the required working pressures. Moreover, the membrane should be insoluble and chemically inert in relation to the solvent and all the ingredients of the solution. Cellulose acetate membranes, which are commercially available, are presently preferred. The membranes may have any suitable shape, for example, the membranes may be tubular or be flat. A series of tubular membranes having their ends connected forms a preferred high rejection membrane system. This same arrangement also forms a preferred low rejection membrane system if large volumes of solvent are to be separated from the solution in the second stage of the process. Usually, the membrane will be externally supported to withstand the working pressures involved in reverse osmosis operations. The dimensions of the membranes and chosen to reflect the volume and degree of concentration desired for the specific feed solution to be concentrated.

The method of the present invention can be used for the concentration of any feed solution to a product solution having an osmotic pressure which is larger than the highest required working pressure. Typical feed solutions include for example, fruit juices, such as orange juice, strawberry juice, and apple juice, and dilute sugar solutions.

The method of the invention can be performed batchwise or continuously, the latter being preferred. As the solids permeating as part of the diluted solution through the low rejection membranes are very often valuable ingredients it is advantageous and desirable to recycle this diluted solution to the original feed solution. Because only a small fraction of the initial feed is recycled, the area of membrane required to practice the process is kept at a minimum.

An embodiment of an apparatus according to the present invention is illustrated in the accompanying drawing. The various parts of the apparatus can be constructed from a variety of materials that are compatible with the various ingredients of the solution and that can withstand the working pressures. For processing food solutions, stainless steel is usually preferred.

The apparatus comprises a feed tank 10, a high pressure pump 12, a high rejection membrane system 14, a low rejection membrane system 16, a product tank 18, and a water tank 20. The pressures within the membrane systems 14 and 16 are adjusted by pressure adjusting means 22 and 24 respectively. Means such as line 26 are provided for recycling the dilute solution from system 16 to feed tank 10. Valves are also provided for controlling the flow of the solutions at various stages in the apparatus and an air accumulator 27 is positioned just upstream of pump 12.

In operation, the feed solution is pumped by pump 12 from tank 10 to a high rejection membrane system 14, wherein part of the solvent, e.g., water, penetrates practically pure through the membrane to water tank 20, while the concentrated solution flows to low rejection membrane system 16. A diluted solution penetrates through the membranes of system 16 and is recycled to feed tank 10 via line 26. The product solution from low rejection membrane system 16 is collected in tank 18. When the process is performed continuously the feed solution is continuously added to tank 10 through line 28 and the product solution in tank 18 and the solvent in tank 20 are continuously removed.

The following examples are illustrative of the invention but are not to be understood as limiting the scope and underlying principles of the invention in anyway. All parts and percentages referred to herein are by weight unless otherwise specifically indicated.

EXAMPLES 1-4

In these examples, cellulose acetate membranes were used in the apparatus described in the accompanying drawing and pressure and concentration measurements were performed at the points marked on the drawing.

The results of the concentration, pressure, and flux measurements are shown in table I below, where:

TABLE 1

| Example | Feed solution | Concentrations (Br°) (at 30° C.) | | | | | Flow rates (liters/day) | | | | | Pressures (p.s.i.) | | | | | Salt rejection of membranes (percent) | | Water flux (g.f.d.) | |
|---|---|---|---|---|---|---|---|---|---|---|---|---|---|---|---|---|---|---|---|---|
| | | $C_F$ | $C_0$ | $C_1$ | $C_2$ | $C_3$ | $Q_F$ | $Q_0$ | $Q_1$ | $Q_2$ | $Q_3$ | $P_0$ | $P_A$ | $P_1$ | $P_B$ | $P_3$ | $R_A$ | $R_B$ | $J_{V_A}$ | $J_{V_B}$ |
| (1) | Sugar solution | 10.3 | 10.6 | 0 | 15 | 44.5 | 148 | 161 | 112 | 13 | 36 | 830 | 820 | 810 | 790 | 760 | 100 | 63 | 0.85 | 0.1 |
| (2) | Orange juice | 10.5 | 10.5 | 0 | 7 | 37 | 128 | 139 | 95 | 11 | 33 | 890 | 850 | 820 | 740 | 700 | 100 | 77 | 0.725 | 0.1 |
| (3) | do | 10.9 | 10.5 | 0 | 6 | 36.5 | 161 | 174 | 115 | 13 | 46 | 900 | 860 | 810 | 750 | 670 | 100 | 88 | 0.88 | 0.1 |
| (4) | do | 10.5 | 13.0 | 0 | 19.5 | 46.5 | 102 | 145 | 79 | 43 | 23 | 850 | 800 | 760 | 680 | 600 | 100 | 50 | 0.60 | 0.66 |

$C$ = concentration in degrees Brix (Br°) measured at 30° C.
$Q$ = rate of flow of the solution in liters per day.
$Jv$ = water flux expressed as gallons of water that pass through 1 sq. foot of membrane per day (g.f.d.).
$R$ = average rejection rate of the membrane.
$P$ = working pressure in p.s.i.

Referring more specifically to the apparatus used in these examples, the high pressure series of membranes 14 comprises 36 tubular ½ inches inside diameter membranes aligned in series and the low-pressure membrane 16 also comprises 36 tubular ½ inches diameter membranes.

The effectiveness of the new method and apparatus is readily understood from the results of the Examples. The invention permits concentrating feed solutions to obtain a product solution which has a higher osmotic pressure than the sum of the highest hydrostatic working pressure applied to the solution, and the osmotic pressure of the solvent solution which is discharged from the system.

Further, the invention permits operating at both desirable pressure levels to avoid membrane compaction and a desirably low ration of volume of solvent passed through the membranes per volume of product recovered. The latter characteristic helps reduce the area of membrane required to obtain apparatus having a given product capacity.

What is claimed is:

1. A method for concentrating a feed solution comprising: forcing a feed solution through a high rejection membrane by subjecting the feed solution to a first working pressure, the diluted solution permeating through the membranes being discarded; forcing the concentrated solution which does not pass through the high rejection membrane and which is still being subjected to a second working pressure as a feed solution to a second membrane having a solid rejection rate that is lower than the rejection rate of the high rejection membrane; and collecting as a product solution the portion of the feed to the second membrane which does not pass through the second membrane, the first and second working pressures being greater than $R^2\pi'$ where $R$ is the rejection rate of the respective membrane, and $\pi'$ is the osmotic pressure of the solution being fed to the membrane.

2. The method of claim 1, in which the dilute solution which passes through the second series of membranes is recycled to the high rejection membrane as part of the feed solution, 3. The method of claim 2 wherein the feed solution is a sugar solution.

4. The method of claim 2 wherein the feed solution is a fruit juice solution.

5. The method of claim 1 wherein the membrane is a cellulose acetate membrane.

6. An apparatus for concentrating a feed solution comprising: a high rejection membrane which receives the feed solution and separates the feed solution into a concentrated feed solution which does not pass through the membrane, a low rejection membrane which receives the concentrated feed solution that does not pass through the high rejection membrane and separates the concentrated feed solution into a product solution which does not pass through the second membrane, and a diluted solution which does not pass through the second membrane; means for applying and for adjusting the working pressure within said membranes; supply means for forwarding the feed solution to said high rejection membrane; means for passing the concentrated feed solution to the low rejection membrane product collection means connected to the high pressure side of said low rejection membranes; and removal means for discharging the diluted solution which permeates through the high rejection membranes.

7. The apparatus of claim 6 including means for recycling to the supply means the solution permeating through the low rejection membranes to prevent loss of valuable dissolved solids.

* * * * *

UNITED STATES PATENT OFFICE
CERTIFICATE OF CORRECTION

Patent No. 3,617,550                    Dated November 2, 1971

Inventor(s) Chaim Elata and Jonatan Ben-Dror

It is certified that error appears in the above-identified patent and that said Letters Patent are hereby corrected as shown below:

Claim 6, line 9, after "which does" delete "not".

Signed and sealed this 11th day of April 1972.

(SEAL)
Attest:

EDWARD M. FLETCHER, JR.
Attesting Officer

ROBERT GOTTSCHALK
Commissioner of Patents